(12) United States Patent
Barton et al.

(10) Patent No.: US 11,015,582 B2
(45) Date of Patent: May 25, 2021

(54) WIND TURBINE BLADE ASSEMBLY

(71) Applicant: Vestas Wind Systems A/S, Aarhus N. (DK)

(72) Inventors: Leon Barton, Newport (GB); Toby Collard, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/955,164

(22) PCT Filed: Dec. 17, 2018

(86) PCT No.: PCT/DK2018/050369
§ 371 (c)(1),
(2) Date: Jun. 18, 2020

(87) PCT Pub. No.: WO2019/120416
PCT Pub. Date: Jun. 27, 2019

(65) Prior Publication Data
US 2020/0318618 A1    Oct. 8, 2020

(30) Foreign Application Priority Data

Dec. 20, 2017    (DK) .......................... PA 2017 70966

(51) Int. Cl.
*F03D 80/30*    (2016.01)
*F03D 1/06*    (2006.01)

(52) U.S. Cl.
CPC ........... *F03D 80/30* (2016.05); *F03D 1/0675* (2013.01); *F05B 2240/301* (2013.01); *F05B 2240/302* (2013.01)

(58) Field of Classification Search
CPC .. F03D 80/30; F03D 1/0675; F05B 2240/301; F05B 2240/302
See application file for complete search history.

(56) References Cited

U.S. PATENT DOCUMENTS 7,922,454 B1 *  4/2011  Riddell .................. F03D 80/30
                                                                416/224
2013/0236321 A1    9/2013  Olthoff
(Continued)

FOREIGN PATENT DOCUMENTS

CN    203339481 U    12/2013
EP    1561947 A2    8/2005
(Continued)

OTHER PUBLICATIONS

Danish Patent and Trademark Office, Search and Examination Report in PA 2017 70966, dated May 2, 2018.
(Continued)

*Primary Examiner* — Tulsidas C Patel
*Assistant Examiner* — Joseph Ortega
(74) *Attorney, Agent, or Firm* — Wood Herron & Evans LLP

(57) ABSTRACT

A wind turbine blade assembly is described. The wind turbine blade assembly comprises: first and second blade sections connected together, each blade section having a shell defining an aerodynamic profile and each section comprising lightning protection components; a substantially enclosed interior region defined in part by the shell of the first blade section and in part by the shell of the second blade section; a first connector located in the interior region, the first connector being attached to the first blade section and electrically connected to the lightning protection components of the first blade section, the first connector defining a contact surface; a second connector located in the interior region, the second connector being attached to the second blade section and electrically connected to the lightning protection components of the second blade section, the second connector defining a contact surface opposed to and in contact with the contact surface of the first connector. The (Continued)

wind turbine blade assembly further comprises a first fastener extending through the shell of the first blade section into the interior region, the first fastener having a threaded shank that extends at least partially through the first and second connectors, and the first fastener clamps the contact surfaces of the first and second connectors together to form a torqued connection between the first and second connectors.

15 Claims, 9 Drawing Sheets

(56) References Cited

U.S. PATENT DOCUMENTS

| 2015/0369211 A1* | 12/2015 | Merzhaeuser | F03D 1/065 |
| | | | 416/61 |
| 2020/0072189 A1* | 3/2020 | Merzhaeuser | F03D 1/0683 |

FOREIGN PATENT DOCUMENTS

| EP | 2650535 A1 * | 10/2013 | F03D 1/0633 |
| EP | 2650535 A1 | 10/2013 | |
| EP | 3054151 A1 | 8/2016 | |
| JP | 2005113735 A | 4/2005 | |
| WO | 2005031158 A2 | 4/2005 | |

OTHER PUBLICATIONS

European Patent Office, International Search Report and Written Opinion in PCT Application No. PCT/DK2018/050369, dated Mar. 20, 2019.

\* cited by examiner

WIND TURBINE BLADE ASSEMBLY

TECHNICAL FIELD

The present invention relates to wind turbine blade assemblies comprising lightning protection components and to techniques for connecting lightning components in a blade assembly.

BACKGROUND

There is a continuing desire to generate increased levels of power from wind power production facilities such as on-shore and off-shore wind farms. One way to achieve this is to modify existing wind turbines by adding devices to the blades. For example, it is known to add devices to the blades to increase the dimensions thereof. One example of this is a tip extension, which may be provided in the form of a sleeve or sock that fits over the tip of a blade and increases the length of the blade. The provision of tip extensions increases the overall length of the blades and thus increases the swept area of the rotor, allowing the wind turbine to capture more energy from the wind.

Another way to generate increased levels of power is to manufacture modern wind turbines with larger blades to increase the swept area of the blades. Transportation of large components, in particular long rotor blades, can be problematic as a wind farm site may be remote and difficult to access. To resolve this problem, the rotor blades may be designed as a modular assembly. The blade may be divided into two or more modules that are easier to transport and which are then assembled on site.

Wind turbine blades often include lightning protection components, which protect the blade from damage in the event of a lightning strike. Lightning protection components typically comprise a plurality of lightning receptors arranged at the surface of the blade. These may be electrically connected to a down conductor cable running longitudinally inside the blade and connected to earth. When fitting a tip extension it is therefore important to establish an electrical connection between the lightning protection components of the existing blade and lightning protection components inside the tip extension. Similarly when assembling a modular blade, it is important to create a robust connection between lightning protection components of the blade modules.

The installation of tip extensions is technically challenging. As the devices are typically installed to wind turbine blades in the field, the process is carried out by operators working at a significant height with exposure to often harsh climate conditions. The process of connecting the lightning receptors of the tip extension to the existing blade's lightning protection components can be difficult and tends to complicate the process of fitting the tip extension. It is therefore important to develop a connection method which is straightforward, reliable and robust.

Similarly, one of the key challenges associated with assembling modular wind turbine blades in the field is ensuring precise alignment between the blade modules. The need to connect lightning protection components at the same time further complicates the process. There is therefore a need for a more straightforward assembly procedure and connection method which can be performed easily and efficiently on site.

It is against this background that the present invention has been developed.

SUMMARY OF INVENTION

According to a first aspect of the present invention there is provided a wind turbine blade assembly comprising first and second blade sections connected together, each blade section having a shell defining an aerodynamic profile and each section comprising lightning protection components. A substantially enclosed interior region is defined in part by the shell of the first blade section and in part by the shell of the second blade section.

A first connector is located in the interior region, the first connector being attached to the first blade section and electrically connected to the lightning protection components of the first blade section, and defining a contact surface. A second connector is located in the interior region, the second connector being attached to the second blade section and electrically connected to the lightning protection components of the second blade section, and defining a contact surface opposed to and in contact with the contact surface of the first connector.

A first fastener extends through the shell of the first blade section into the interior region, the first fastener having a threaded shank that extends at least partially through the first and second connectors. The first fastener clamps the contact surfaces of the first and second connectors together to form a torqued connection between the first and second connectors.

In certain embodiments the first blade section may be a tip extension and the second blade section may be a wind turbine blade adapted to receive the tip extension. In other embodiments the first and second blade sections may be respective modules of a modular wind turbine blade.

The first connector may be attached to an inner surface of the shell of the first blade section. The second connector may be attached to an end face of the second blade section, for example in cases where the second blade section is an existing blade adapted to receive a tip extension. Alternatively, the second connector may be attached to an inner surface of the shell of the second blade section, for example in cases where the first and second blade sections are respective modules of a modular wind turbine blade.

One of the first or second connectors may comprise a through bore having a diameter that is oversized in comparison to a diameter of the shank of the first fastener. The shank may extend through the through bore and into mating engagement with the other connector.

A second fastener may extend through the shell of the first blade section. The second fastener may extend at least partially through the first and second connectors. The first and second fasteners may extend through opposite sides of the shell of the first blade section.

In certain embodiments the first and/or second connectors may be shaped as wedges.

The second connector may be configured to bend or flex upon sliding contact with the first connector. Bending or flexing of the second connector preferably causes the contact surface of the second connector to become substantially flush with the contact surface of the first connector.

The first blade section may include a metallic layer at or near an outer surface of its shell. The first fastener may electrically connect the metallic layer to the first and second connectors. The second blade section may include a metallic layer at or near an outer surface of its shell. A further fastener may extend through the shell of the second blade section to electrically connect the metallic layer of the second blade section with the second connector. Accordingly, the first and second connectors may electrically connect the respective metallic layers of the first and second blade sections. Optionally the second blade section may comprise a further connector attached to an inner surface of the second blade section. A further fastener may extend through the shell and metallic layer of the second blade section to electrically connect the metallic layer of the second blade module to the second connector.

The contact surfaces of the first and second connectors are preferably mutually parallel planar surfaces. The or each fastener is preferably a metal fastener, such as a bolt.

According to a further aspect of the present invention there is provided a method of forming a blind connection between lightning protection components of a first blade section and lightning protection components of a second blade section when connecting the first and second blade sections together. The method comprises: providing a first blade section having a shell defining an aerodynamic profile, the first blade section comprising a first connector electrically connected to the lightning protection components of the first blade section, the first connector defining a contact surface; providing a second blade section having a shell defining an aerodynamic profile, the second blade section comprising a second connector electrically connected to the lightning protection components of the second blade section, the second connector defining a contact surface; arranging the first and second blade sections together such that the respective shells of the first and second blade sections define a substantially enclosed region in which the first and second connectors are located with their respective contact surfaces mutually opposed; inserting a fastener through the shell of the first blade section such that a threaded shank of the fastener extends into the interior region and extends at least partially through the first and second connectors; and turning the fastener from outside the shell of the first blade section to create a clamping force between the contact surfaces of the first and second connectors thereby establishing a torqued connection between the first and second connectors.

The step of arranging the first and second blade sections together preferably causes the first connector to slide into position relative to the second connector.

Sliding contact between the contact surfaces of the connectors may cause the second connector to bend or flex such that the contact surface of the first connector becomes substantially flush with the contact surface of the second connector.

The connectors may be wedge shaped and taper in thickness in opposite directions. Sliding contact between the connectors may therefore cause intimate contact between the respective contact surfaces.

Optional features described herein in relation to the first aspect of the present invention are equally applicable to the second aspect of the present invention and vice versa. Repetition of these optional features has been avoided purely for reasons of conciseness.

BRIEF DESCRIPTION OF THE DRAWINGS

The present invention will now be described in further detail by way of non-limiting examples with reference to the following figures, in which.

DETAILED DESCRIPTION

Figure 1:
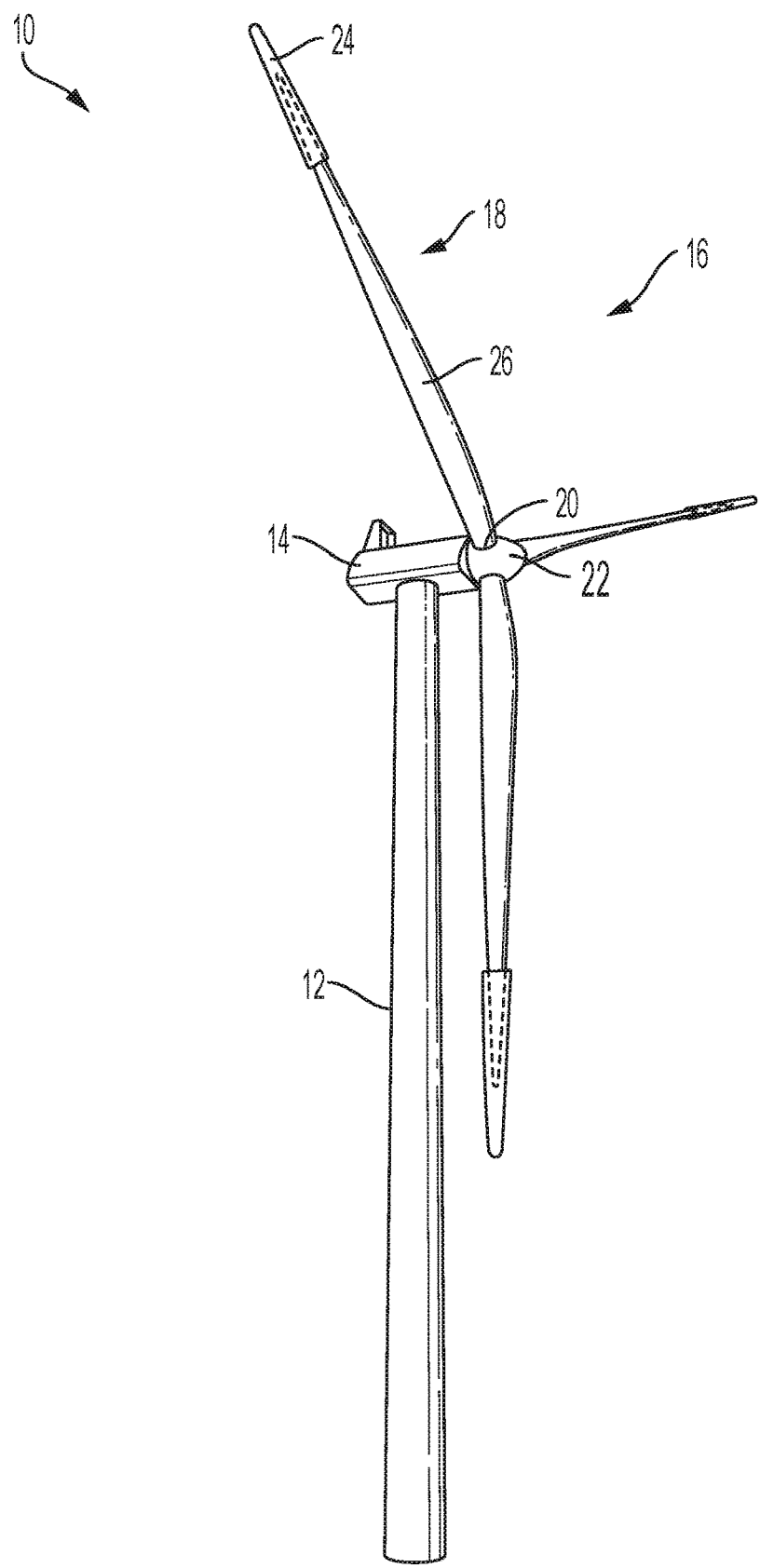
FIG. 1 is a schematic representation of a modern utility-scale wind turbine in which the blades are fitted with tip extensions according to an embodiment of the present invention.

FIG. 1 is a schematic view of a wind turbine 10 according to an embodiment of the present invention. The wind turbine 10 comprises a tower 12 supporting a nacelle 14. A rotor 16 is mounted to the nacelle 14. The rotor 16 comprises a plurality of radially extending wind turbine blade assemblies 18 which are attached at their respective root ends 20 to a central hub 22. In this example, the rotor 16 comprises three blade assemblies 18, but in other embodiments the rotor 16 may have any number of blades 18. Each of the blades 18 is formed of first and second blade sections 24, 26. In the present embodiment, the first blade section 24 is in the form of a tip extension, retro-fitted to extend the effective length of the blade 18. The second blade section 26 comprises an existing wind turbine blade to which the tip extension 24 is fitted.

Figure 2:
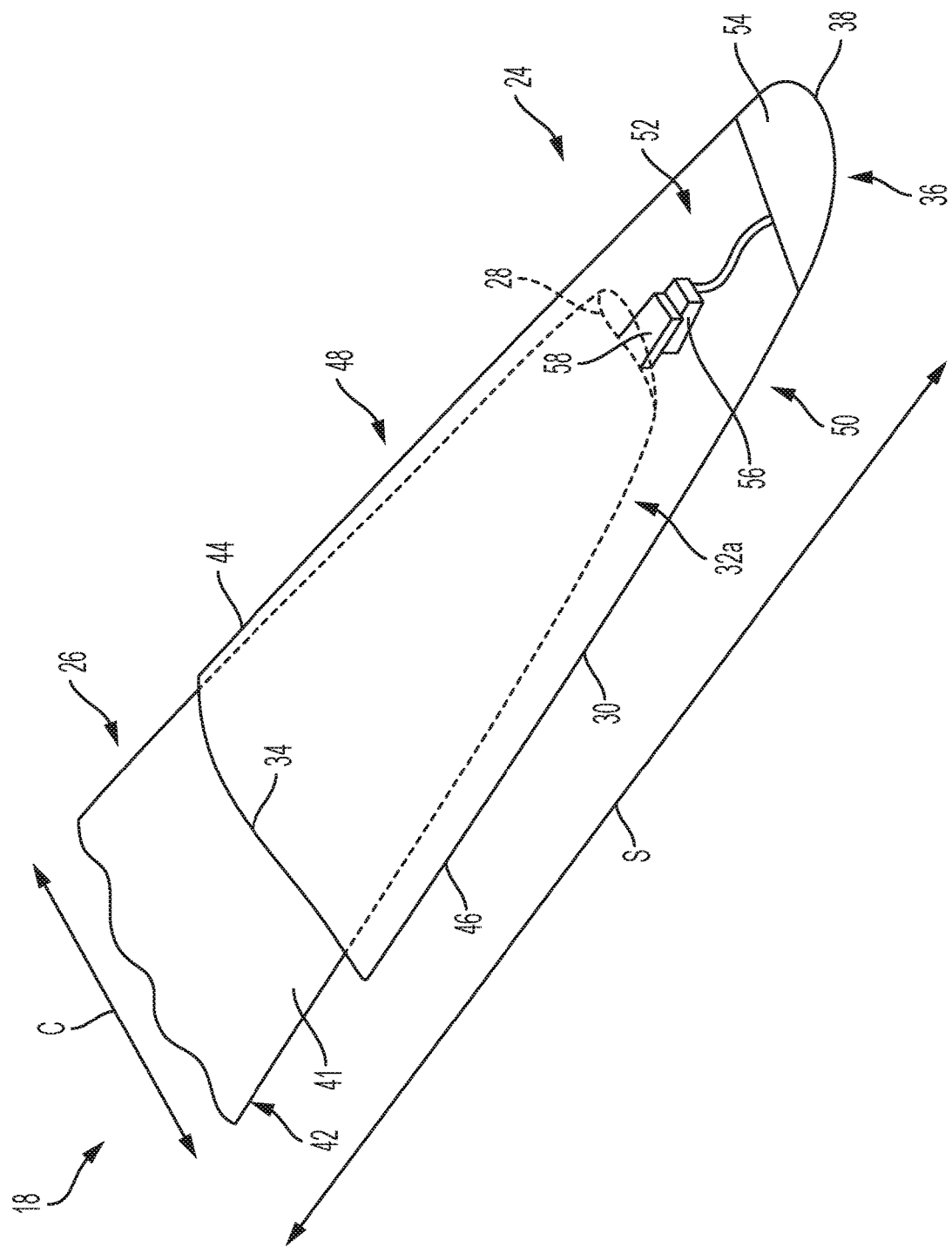
FIG. 2 shows a portion of a blade assembly comprising a blade fitted with a tip extension.

FIG. 2 is a schematic view of a portion of a modified wind turbine blade assembly 18. The blade assembly 18 comprises first and second blade sections 24, 26 where the first blade section 24 is a tip extension and the second blade section 26 is the existing wind turbine blade according to an embodiment of the present invention. The tip extension 24 in this example is in the form of a sock, which fits over a tip end 28 of the existing blade 26. The tip extension 24 comprises an outer shell 30 defining an aerodynamic outer profile and a substantially hollow interior 32 (indicated in FIG. 3c) for receiving the tip end 28 of the existing blade 26.

The tip extension has an inboard end 34 and an outboard end 36. When fitted to the existing blade 26, the inboard end 34 of the tip extension 24 is located closer to a root 20 (see FIG. 1) of the blade 26 than the outboard end 36. The inboard end 34 of the tip extension 24 is open to receive the tip end 28 of the existing blade 26. The outboard end 36 of the tip extension 24 is closed and comprises a tip 38, which forms the tip of the wind turbine blade assembly 18 when the tip extension 24 is fitted to the blade 26. A substantially enclosed interior region 32a is defined between the shell 30 of the tip extension 24 and the shell 42 of the existing blade 26, when the tip extension 24 is fitted.

The outer shell 30 of the tip extension 24 extends longitudinally in a spanwise direction S between the open inboard end 34 towards the tip 38, and extends transversely in a chordwise direction C between a leading edge 44 and a trailing edge 46. The outer shell 30 defines an airfoil profile in cross-section.

When fitted to the blade 26, an inboard portion 48 (also referred to as an 'overlap portion') of the tip extension 24 overlaps the tip end 28 of the existing blade 26. The tip extension 24 is bonded to the existing blade 26 in the overlap portion 48. An outboard portion 50 of the tip extension 24, comprising the tip-extension tip 38, serves to extend the overall length of the blade 18.

The tip extension 24 comprises components of a lightning protection system 52. In this example, the tip extension 24 includes a lightning tip receptor 54 at the tip 38 of the tip extension 24. In other examples, the tip extension 24 may include additional lightning receptors. When the tip extension 24 is fitted to the blade 26, the lightning protection components 52 in the tip extension 24 must be connected to the existing lightning protection system in the blade 26. As will be discussed in further detail below, this is achieved via a first connector 56 in the tip extension 24 which connects to a second connector 58 fitted to the second blade section 26 at the end of the existing blade.

Figure 3A:
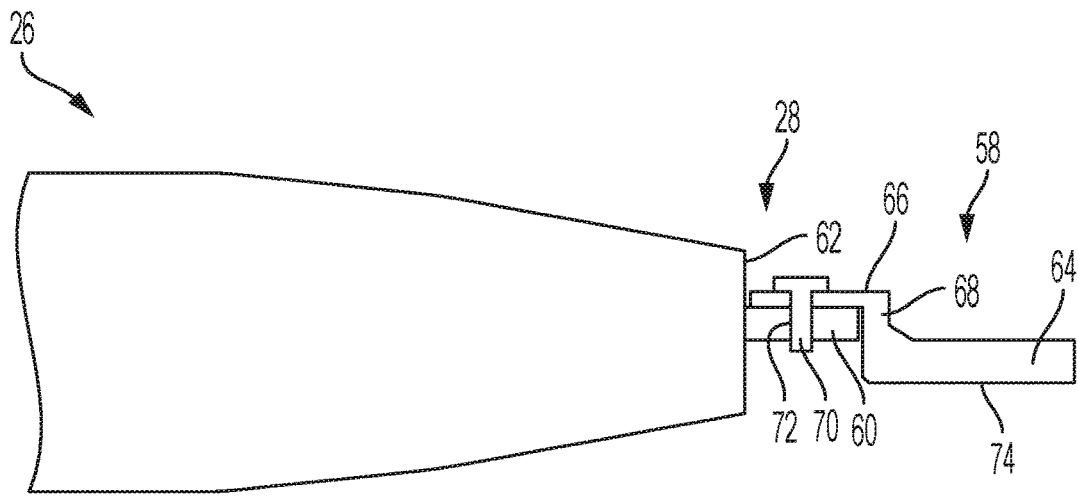
FIG. 3a is a schematic cross-sectional view showing an end portion of an existing blade according to a first example modified to receive a tip extension.
Figure 3B:
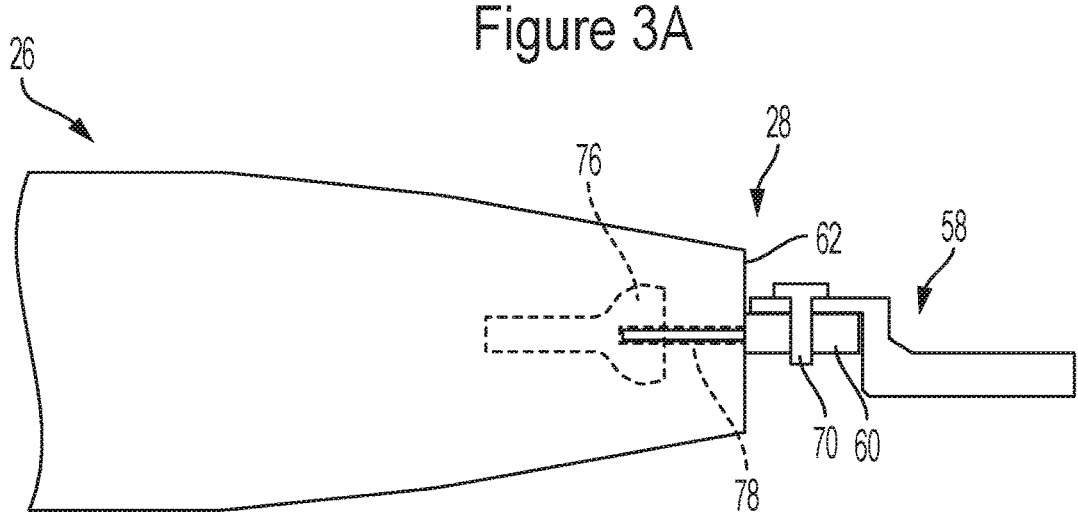
FIG. 3b is a schematic cross-sectional view showing an end portion of an existing blade according to a second example modified to receive a tip extension.

FIGS. 3a and 3b show how existing wind turbine blades 26 may be modified to accept a tip extension 24 and to enable an electrical connection between the lightning protection components of the existing blade 26 and the lightning protection components 52 of the tip extension 24.

FIG. 3a shows an existing blade 26 modified to receive a tip extension 24. Prior to modification, the existing blade 26 included a lightning receptor in the form of a solid metal tip (not shown), which was connected to a metal coupling 60 projecting from the tip end 28 of the blade 26. The metal coupling 60 is electrically connected to the blade's lightning protection system. Typically the coupling 60 is made from a high-strength and electrically-conductive material. In this example it is made from stainless steel. After removal of the solid metal tip, a second connector 58 is fixed to the coupling 60 at the end face 62 of the second blade section 26.

The second connector 58 comprises a connector block 64, a mounting flange 66 and a neck 68, which extends between the connector block 64 and the mounting flange 66. The mounting flange 66 is used to connect the second connector 58 to the coupling 60 via a fastener 70. In this example the fastener 70 is a threaded bolt. Advantageously, the same or similar fastener 70 that had previously been used to attach the solid metal tip to the coupling 60 may be used to attach the second connector 58. This conveniently allows existing holes 72 in the coupling 60 to be used without further drilling being required.

Advantageously, the second connector 58 may be made from a relatively soft conductive material such as brass or another metal or alloy, which is easier to drill into than stainless steel. The second connector 58 has a contact surface 74, which in this example is a lower surface of the connector block 64 in the orientation of the second connector 58 shown in FIG. 3a. The contact surface 74 is preferably substantially flat.

FIG. 3b shows an alternative example of an existing blade 26 modified to receive a tip extension 24. This blade 26 did not previously include a solid metal tip, but instead includes an internal metallic lightning receptor ball 76 near the tip 28 of the blade 26. The tip of the blade 26 has been removed, e.g. cut off, and a stainless steel coupling 60 similar to the coupling 60 in FIG. 3a has been attached to the blunt end 62 of the blade 26. The coupling 60 is electrically connected to the receptor ball 76 by a metal threaded shaft 78. Prior to fitting the coupling 60, the receptor ball 76 is drilled and tapped to receive the threaded shaft 78. After fitting the coupling 60, the second connector 58 may then be attached to the coupling 60 using a fastener 70 in the same way as described with reference to FIG. 3a. It will be appreciated that the resulting interface at the end 28 of the blade 26 is therefore substantially the same in both FIGS. 3a and 3b, despite the existing blade 26 having a different design in each of the aforementioned examples.

Figure 3C:
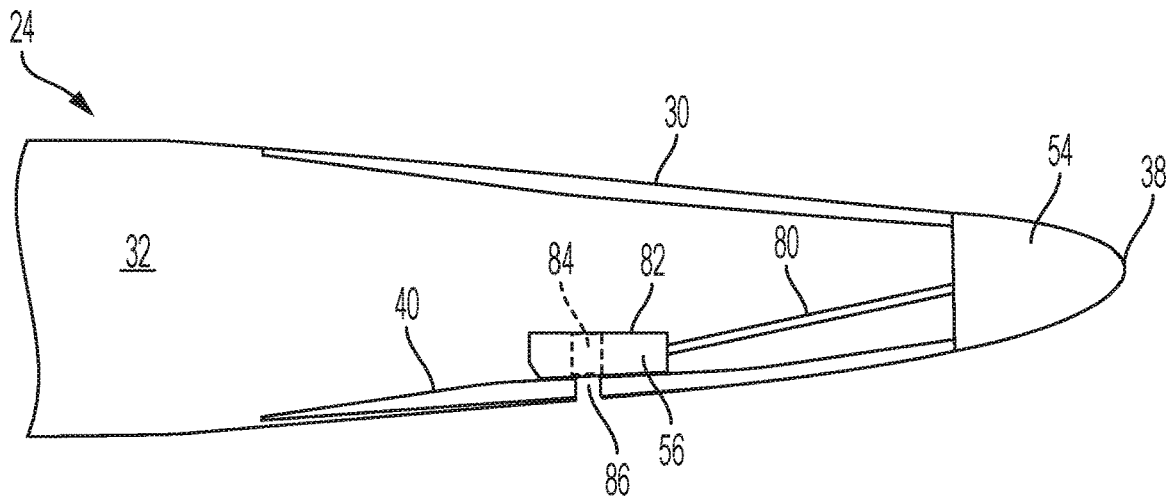
FIG. 3c is a schematic cross-sectional view of the tip extension shown in FIG. 2.

FIG. 3c is a schematic sectional view of the tip extension 24 shown in FIG. 2. The first connector 56 is attached, e.g. bonded, to an internal surface 40 of the tip extension shell 30. The first connector 56 is made from metal, e.g. brass. The first connector 56 is electrically connected to the lightning receptor 54 in the tip extension 24 via a cable 80. In this example the lightning receptor 54 is located at the tip 38 of the tip extension 24. The first connector has a contact surface 82, which is an upper surface in the orientation of the first connector 56 shown in FIG. 3c. The first connector 56 has an open-ended through bore 84 extending through its thickness. A through bore 86 is also provided through the tip extension shell 30, coaxial with the first connector bore 84. The bores 84, 86 are preferably of equal diameter. The bores 84, 86 may be created by drilling through the shell 30 and first connector 56. In this example the bores 84, 86 have a diameter of approximately 17.5 mm. The tip extension 24 is preferably pre-assembled in a factory with the first connector 56 attached to the shell 30 and the bores 84, 86 pre-formed, ready for fitting to a blade 26 in the field.

Figure 4A:
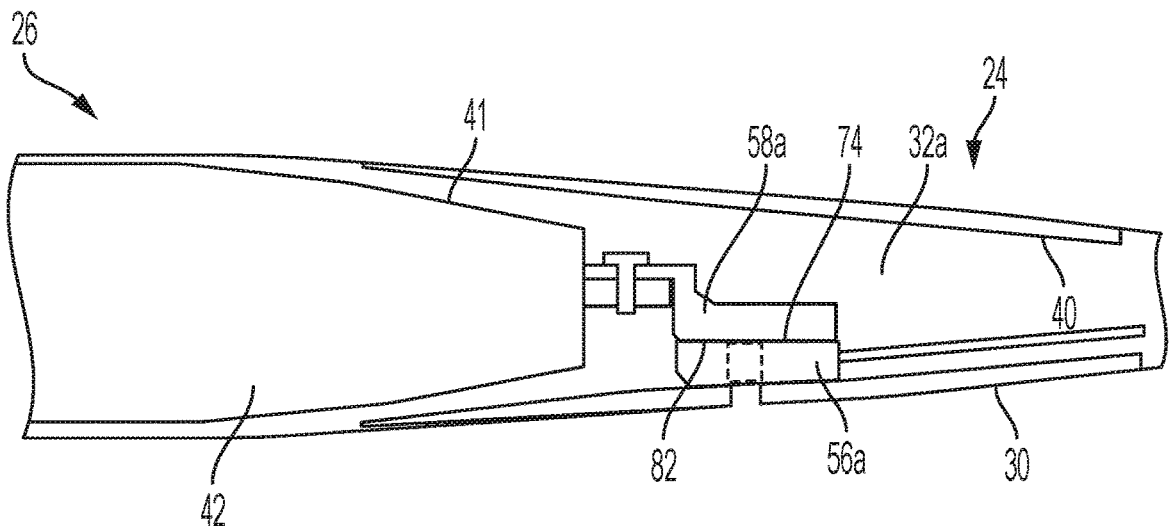
FIGS. 4a, 4b and 4c schematically illustrate a method of connecting lightning protection components inside a tip extension with lightning protection components of an existing blade according to a first embodiment of the present invention.
Figure 4B:
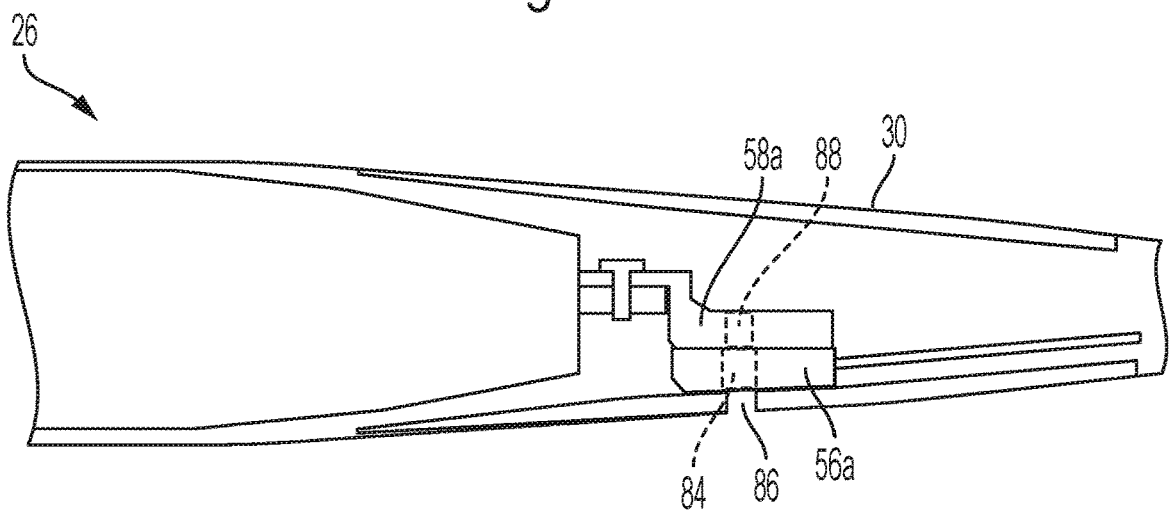
Figure 4C:
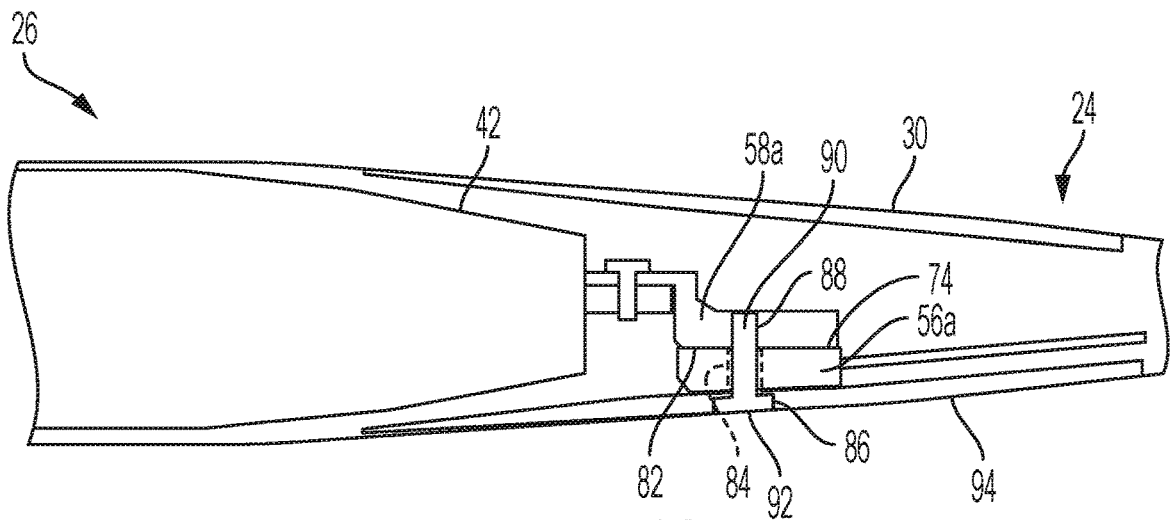

FIGS. 4a, 4b and 4c schematically illustrate how the lightning protection components 52 of a tip extension 24 are connected to the lightning protection system of the existing blade 26 during the process of fitting the tip extension 24 to the blade 26 in accordance with an embodiment of the present invention.

FIG. 4a shows the tip extension 24 fitted to an existing blade 26, such as the existing blade shown in FIG. 3a or 3b. When the tip extension 24 is fitted to the blade 26, a substantially enclosed interior region 32a is defined between an inner surface 40 of the shell 30 of the tip extension 24 and an outer surface 41 of the shell 42 of the blade 26. The first connector 56a mounted inside the tip extension 24 is located adjacent to the second connector 58a, such that the respective contact surfaces 82, 74 of the first and second connectors 56a, 58a are mutually opposed. In the orientation shown in FIG. 4a, the first connector 56a essentially slides underneath the second connector 58a when the tip extension 24 is fitted.

Referring now to FIG. 4b, a drill is inserted through the aligned bores 84, 86 in the tip extension shell 30 and the first connector 56a and is used to bore a blank hole 88 in the second connector 58a. The bore 88 in the second connector 58a may advantageously have a smaller diameter than the bores 84, 86 in the first connector 56a and the tip extension shell 30. In this example the bore 88 in the second connector 58a has a diameter of 14 mm in comparison to the 17.5 mm diameter of the through bores 84, 86 in the first connector 56 and the tip extension shell 30.

Referring to FIG. 4c, a first fastener 90 is inserted through the mutually aligned bores 84, 86, 88 from the outside of the tip extension shell 30. The first fastener 90 may comprise a self-tapping bolt. In this example, the first fastener 90 is a self-tapping M16 bolt with an oversized shank, which cuts an M16 thread in the 14 mm bore 88 of the second connector 58a. The through bores 84, 86 in the first connector 56a and tip extension shell 30 preferably have a diameter larger than the diameter of the first fastener's 90 shank. In other words, these bores 84, 86 are oversized in relation to the first fastener 90. Accordingly, when the first fastener 90 is tightened, a clamping force is exerted between the second connector 58a and the first connector 56a, causing the mutually opposed contact surfaces 82, 74 of the first and second connectors 56a, 58a to clamp together. A torqued connection is therefore advantageously made between the lightning protection components of the existing blade 26 and those of the tip extension 24. Advantageously this torqued connection is a 'blind' connection and is able to be made from outside the blade shell 30 without the need for large access holes or windows through the outer shells 42, 30 of the existing blade 26 or tip extension 24.

The first fastener 90 is preferably a metal fastener, which advantageously forms both a mechanical and electrical connection between the two components. The head 92 of the first fastener 90 may also act as a lightning receptor at an outer surface 94 of the tip extension 24.

Alternative embodiments of the present invention will now be described with reference to FIGS. 5 and 6.

Figure 5:
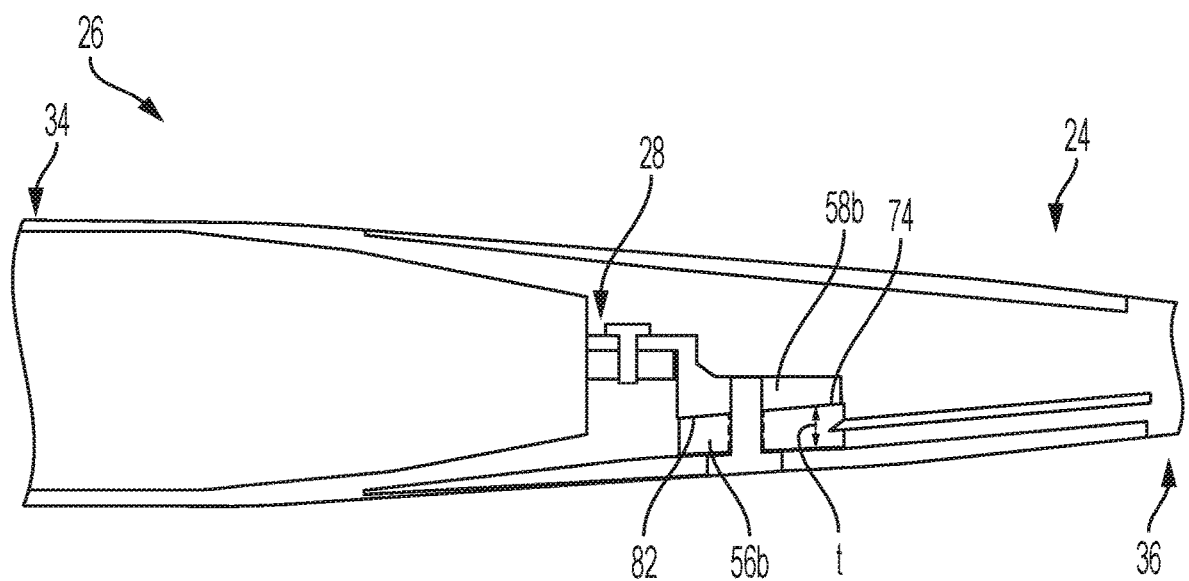
FIG. 5 schematically illustrates a connection between lightning protection components inside a tip extension with lightning protection components of an existing blade according to a second embodiment of the present invention.

FIG. 5 depicts a further blind connection method between a tip extension 24 and an existing blade 26. Again the tip end 28 of the existing blade 26 is modified to receive a tip extension 24, as discussed previously with reference to FIGS. 3a and 3b. However, in this example the first and second connectors 56b, 58b are both shaped as wedges. The first and second connectors 56b, 58b both have a thickness t that tapers along the spanwise length of the contact surfaces 82, 74. The first connector 56b is tapered in an opposite sense to the second connector 58b. The first connector 56b tapers with its thickness reducing towards an inboard end 34 of the first blade section 24, whereas the second connector 58b tapers with its thickness reducing towards an outboard end 36 of the first blade section 24. The first and second connectors 56b, 58b therefore both have inclined contact surfaces 82, 74, which are inclined in opposite directions to one another.

This arrangement has a number of advantages. Firstly, it reduces the possibility of the ends of the first and second connectors 56b, 58b clashing when the tip extension 24 is fitted onto the blade 26. Secondly, it ensures that there is frictional contact between the first and second connectors 56b, 58b during the fitting process, which makes it possible for the fitter to feel when the two parts are correctly located despite this being a blind connection. Thirdly, it prevents the possibility of the first connector 56b being moved past the second connector 58b. Fourthly, a more intimate physical and electrical contact may be created between the inclined contact surfaces 82, 74 of the connectors 56b, 58b.

Figure 6A:
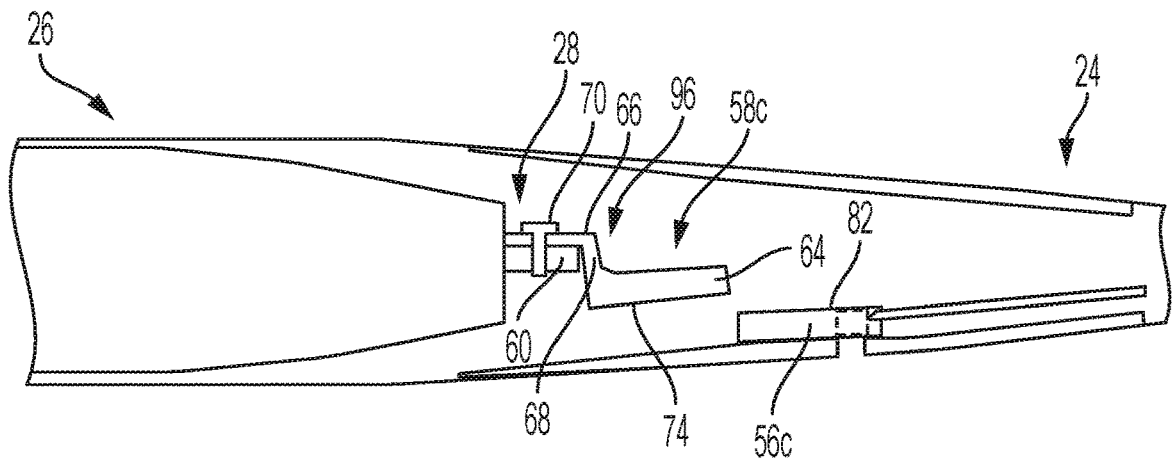
FIGS. 6a, 6b and 6c schematically illustrate a method of connecting lightning protection components inside a tip extension with lightning protection components of an existing blade according to a third embodiment of the present invention.
Figure 6B:
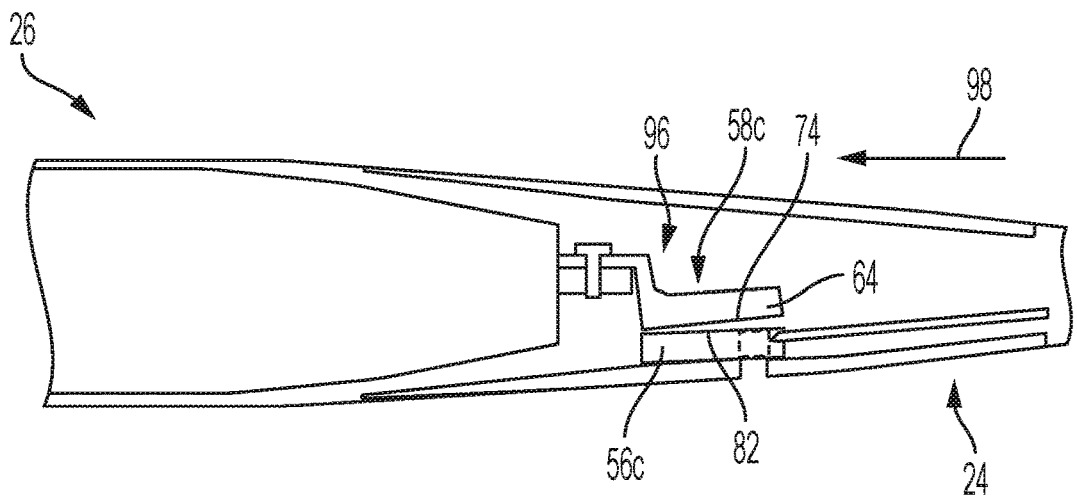
Figure 6C:
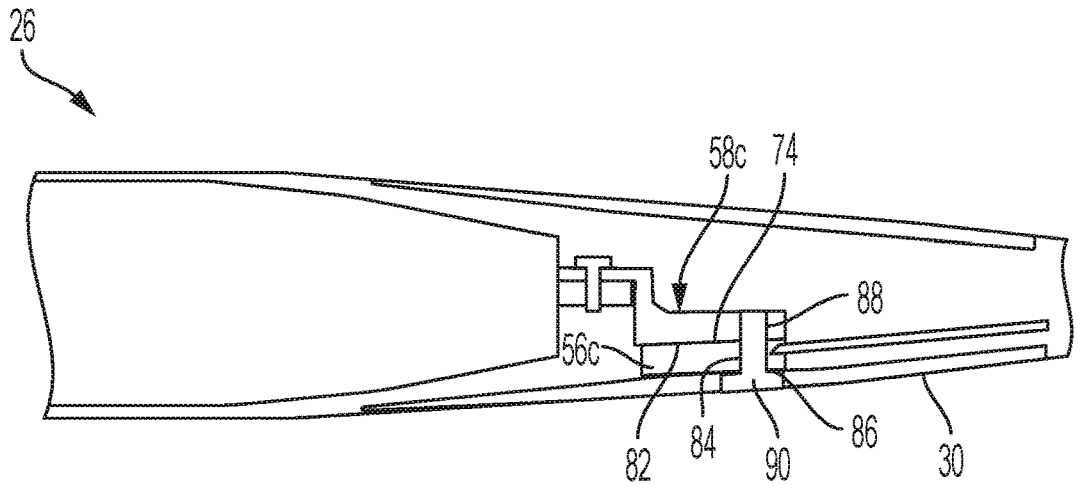

A further embodiment of the present invention is shown in FIGS. 6a, 6b and 6c. Again the existing blade tip 28 with the coupling 60 is modified to receive a tip extension 24. A second connector 58c is affixed to the coupling 60 by a fastener. In this embodiment the second connector 58c is configured to deflect upon sliding contact with the first connector 56c, as described in more detail below.

In common with the previous embodiments, the second connector 58c comprises a connector block 64 and a mounting flange 66 joined by a neck 68. However, in this embodiment the second connector 58c includes in-built flexibility allowing it to bend or flex slightly upon sliding contact with the first connector 56c. In particular, the neck 68 defines a hinge portion 96. In this embodiment the cross-sectional area of the neck 68 of the second connector 58c is reduced in comparison to the neck 68 of the second connectors 58a, 58b of the previous embodiments. The connector block 64 is also upwardly inclined, in the orientation as shown in the figure. The neck 68 in this embodiment therefore functions as a hinge, and causes the connector block 64 to deflect downwardly upon sliding contact between the contact surfaces 82, 74 of the first and second connectors 56c, 58c. The initial inclination of the connector block 64 provides increased space for the first connector 56c to slide into position without clashing with the first connector 56. The hinge action of the second connector 58c results in a more intimate connection between the connectors 56c, 58c.

In other embodiments the hinge portion 96 of the second connector 58c may be achieved in other ways. For example, a mechanical hinge may be provided between the connector block 64 and the mounting flange 66. Alternatively, the neck 68 could be made more flexible through use of softer materials.

FIG. 6b shows the tip extension 24 moving in a spanwise direction of the arrow 98 toward the root end 20 of the blade 18. The movement results in contact between the contact surface 74 of the second connector 58c and the contact surface 82 of the first connector 56c in the tip extension 24. A frictional interaction between the two surfaces 82, 74 subsequently causes the second connector 58c to bend or flex in the hinge portion 96, rotating the connector block 64 about the aforementioned hinge portion 96. Full contact is achieved over the complete area of the first and second contact surfaces 82, 74 when the tip extension 24 is moved further in a spanwise direction to the correct spanwise position.

As in the previous embodiments described above, FIG. 6c shows a bore 88 drilled through the bores 84, 86 in the first connector 56c and tip extension shell 30 and into the second connector 58c. Following this, a first fastener 90 is inserted into the drilled bore 88. In this example the first fastener 90 is a self-tapping bolt. Turning the bolt forms a torqued connection clamping together the connecting faces 82, 74 of the first and second connectors 56c, 58c.

Figure 7:
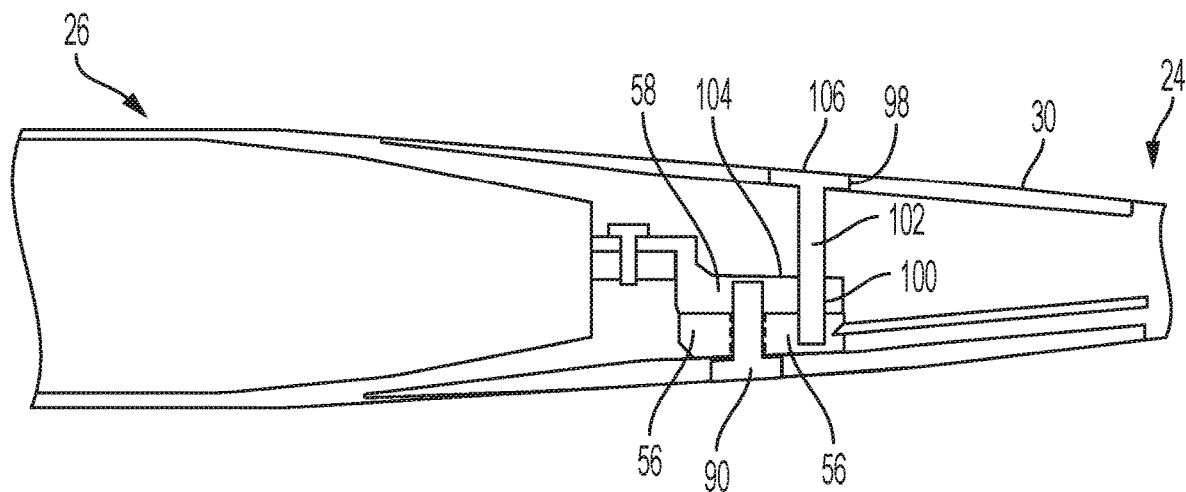
FIG. 7 illustrates a supplementary connection stage that may be carried out subsequent to the stages shown in any of FIG. 4c, 5 or 6c.

FIG. 7 shows an optional further stage of the tip extension assembly process. This stage is applicable subsequently to the stages shown in any of FIGS. 4c, 5, and 6c. A bore 98 is drilled through the tip extension shell 30 on the opposite side of the shell to that in which the first fastener 90 was inserted as shown in FIGS. 4c, 5c and 6c. The bore 98 is drilled at a predetermined location opposite the second connector 58. Following this, a drill is inserted through the bore 98 in the tip extension shell 30 and a further bore 100 with a smaller diameter than that of the bore 98 in the tip extension shell 30 is drilled in the second connector 58. The bore depth may or may not extend completely through the second connector 58 and into the first connector 56 but will extend at least into the second connector 58.

A second fastener 102 is then inserted into the drilled bores 98, 100 from the outside of the shell 30. The second fastener 102 in this example comprises a self-tapping bolt which is used to cut a thread into an upper surface 104 of the second connector 58. This bolt 102 does not provide means to create a torqued connection between the first and second connectors 56, 58 but is used to create a further lightning receptor 106 on the opposite side of the blade 18 to that of the first fastener 90.

Figure 8:
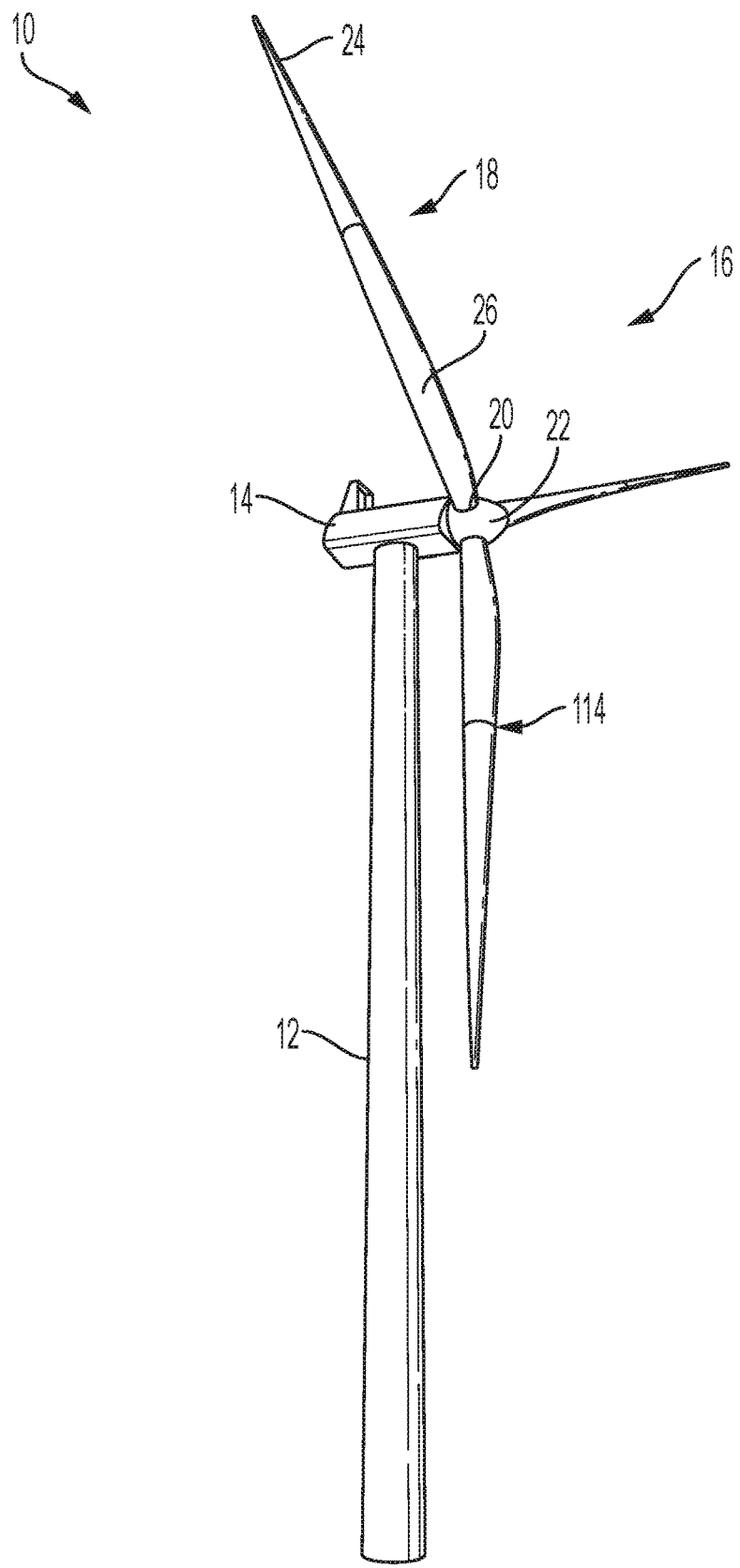
FIG. 8 is a schematic representation of a modern utility-scale wind turbine with modular blade assemblies according to an embodiment of the invention.

FIG. 8 is a schematic representation of a modern utility scale wind turbine 10 in accordance with a further embodiment of the present invention. The wind turbine comprises a tower 12 supporting a nacelle 14 and a rotor 16 mounted to the nacelle 14. The rotor 16 comprises a plurality of radially extending wind turbine blade assemblies 18 which are attached at their respective root ends 20 to a central hub 22. In this example, the rotor 16 comprises three blade assemblies 18, but in other embodiments the rotor 16 may have any number of blade assemblies 18. The wind turbine blade assemblies 18 in this example comprise first and second blade sections 24, 26, though more than two sections per blade 18 may be used in other embodiments. The first and second blade sections 24, 26 in this embodiment are respectively first and second blade modules of a modular wind turbine blade assembly 18. As explained by way of background, the blade modules 24, 26 may be assembled at the wind farm site to facilitate easier transportation of the large components.

Figure 9A:
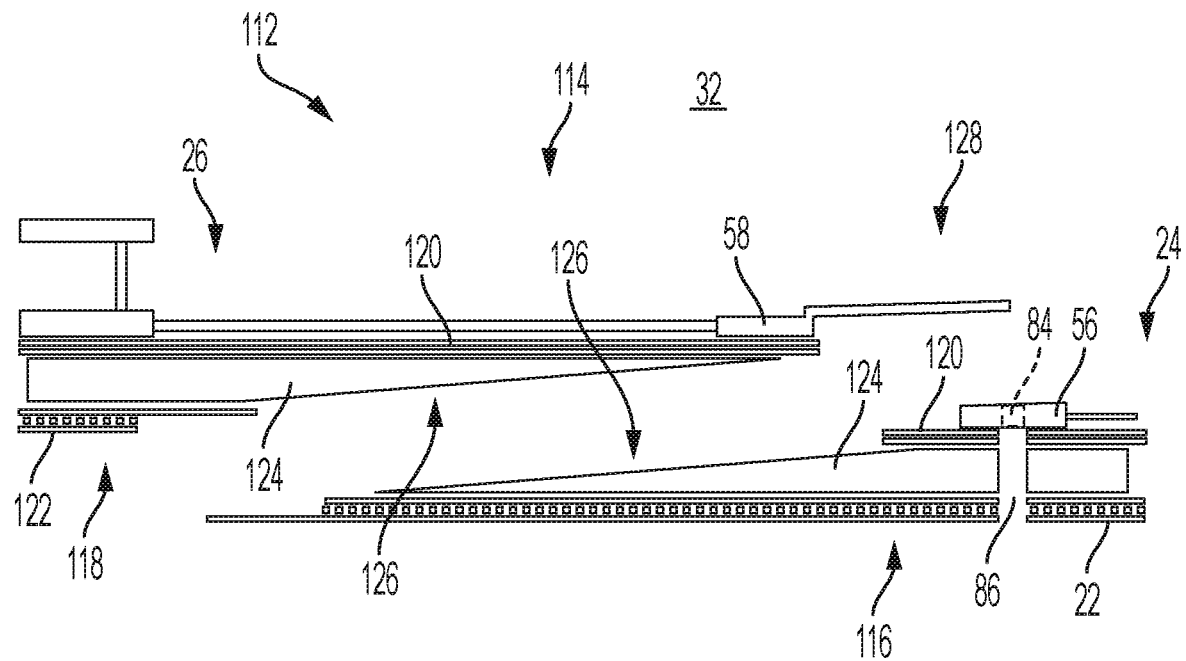
FIGS. 9a and 9b show schematic cross-sectional views through part of a shell of a modular blade in a joint region between two blade modules.
Figure 9B:
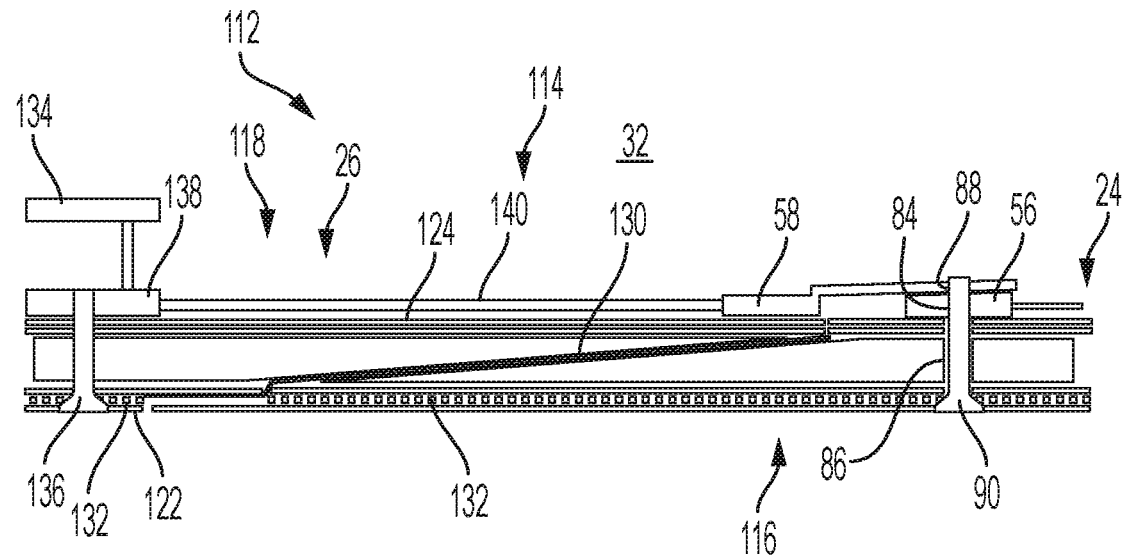

FIGS. 9a and 9b show schematic cross sectional views of one side of a blade assembly 18 through a shell 112 in a joint region 114 between first and second blade modules 24, 26 according to an embodiment of the present invention.

FIG. 9a schematically shows part of a first and second blade module 24, 26 before the modules are bonded together to form the blade assembly 18. Each module 2b, 26 has a shell 116, 118 of laminate composite construction, comprising inner and outer skins 120, 122. Typically the skins 120, 122 are made from a fibre reinforced polymer such as glass-fibre reinforced plastic (GFRP). Core material such as foam (not shown) may be provided between the skins 120, 122 in some areas. Each module 24, 26 includes a spar cap 124 embedded within its shell 116, 118. The spar caps 124 each have a tapered end 126. The tapered ends 126 of the spar caps 124 may be adhesively bonded together to form a scarf joint (as shown in FIG. 9b) in order to connect the modules 24, 26 together. When connecting the modules 24, 26 together, it is necessary to establish an electrical connection between lightning protection components of the first and second blade modules 24, 26.

Referring still to FIG. 9a, the first and second blade modules 24, 26 are pre-assembled in a factory prior to being transported to the wind farm site. A first connector 56 is bonded to an inner surface 120 of the first blade module 24. The first connector 56 comprises a bore 84 which is coaxially aligned with a corresponding bore 86 in the first module shell 116. The first connector 56 is electrically connected to the lightning protection system components of the first blade module 24.

A second connector 58 is bonded to the inner surface 120 of the second blade module 26. The second connector 58 is electrically connected to the lightning protection system components of the second blade module 26. Advantageously, the second connector 58 is located at a joint end 128 of the second blade module 26.

The blade modules 24, 26 may be bonded together in correct alignment for structural and aerodynamic performance using adhesive 130. Bonding the blade modules 24, 26 together to form the complete modular wind turbine blade 18 forms a substantially enclosed interior region 32 inside the blade 18. The first and second connectors 56, 58 of the first and second blade modules 24, 26 respectively are located in the interior region 32 of the blade 18. Following accurate positioning and bonding of the blade modules 24, 26 the first and second connectors 56, 58 inside the blade assembly 18 will be aligned in mutually-opposed relation similar to the embodiments described previously.

FIG. 9b shows the modular blade assembly 18 following application of adhesive 130 between the blade modules 24, 26 and insertion of a first fastener 90 to connect the lightning protection components of both modules.

A drill is used to bore a blank hole 88 in the second connector 58. The bore 88 is drilled by inserting the drill through the coaxial bores 84, 86 already present in the first module shell 116 and the first connector 56. The bore 88 has a smaller diameter than the coaxial bores 84, 86 of the first connector and first blade module 56, 24 as described in embodiments above. Following drilling, a first fastener 90 is inserted through the coaxial bores 86, 84 into the second connector 58 to provide a connection between the lightning protection components of the first and second blade modules 24, 26. In this example the first fastener 90 comprises a self-tapping metal bolt, which provides a blind torqued connection requiring no access from inside the blade 18.

In some blade designs a surface protection layer (SPL) 132 may be incorporated at or near the outer surfaces of the blade modules 24, 26. The SPL 132 comprises a metallic layer e.g. of conductive aluminium mesh, which dissipates electrical charge when lightning is incident on the blade 18. To provide effective protection, the SPL 132 must be electrically connected to the down conductor 134 in the blade assembly 18. An electrical connection between the SPL 132 of the first and second blade modules 24, 26 across the joint of the modular blade 18 may conveniently be established using the connection method of the present invention.

The first fastener 90 serves a dual purpose in terms of lightning protection. The metal bolt 90 provides a torqued connection clamping the first and second connectors 56, 58 whilst also connecting the SPL 132 to the down conductor 134 within the turbine blade 18.

A further fastener 136 extends through the shell 118 of the second blade module 26 to electrically connect the SPL 132 of the second blade module 26 to the second connector 58 and thus to the other lightening protection components of the blade 18. The further fastener 136 may extend directly into the second connector 58. However, in this example an optional further connector 138 is fixed to the inner surface 120 of the second blade shell 118. The further fastener 136 extends through the shell 118 and into the further connector 138. The further connector 138 is, in turn, electrically connected to the second connector 58 via a cable 140 inside the second blade module 26. The further fastener 136 in this example may also provide a further lightning receptor at the exterior surface 122 of the blade shell 118.

Whilst the fasteners 90, 136 are shown to extend through the spar caps 124 in FIG. 9b, it should be understood that FIGS. 9a and 9b are schematic figures used for convenience to illustrate joint region of the modular blade. Preferably the fasteners 90, 136 do not extend through the spar caps 124. Instead, the fasteners 90, 136 may extend through a portion of the shell adjacent to but not opposed to the spar caps 124. Therefore the connectors 56, 58, 138 are preferably also mounted adjacent to but not opposed to the spar caps 124. This advantageously avoids the need to drill through the spar caps 124.

In other embodiments of the present invention, the first and second connectors 56, 58 may take a different form. For example, a similar concept to the wedge shaped connectors described with relation to a tip extension 24 in FIG. 5 may be applied to the modular blade connection example in FIG. 9. Alternatively a hinged connector such as that shown in FIG. 6 is also applicable to the connection of lightning protection system components in modular blade assemblies 18. It must also be noted that the connection methods described above would also apply to a converse arrangement to the present embodiment; with the second connector 58 as shown in FIG. 9 bonded to the first blade module 24 and the first connector 56 as shown in FIG. 9 bonded to the second blade module 26.

It may be desirable to insulate the connection formed between the first connector and the second connector. To achieve this, once the connection has been formed, liquid resin can be injected (though a hole in the blade surface) into the enclosed interior region such that the resin floods the enclosed interior region and encapsulates the first and second connectors. The resin is then left to cure until solid. The resin is electrically insulating (i.e. non-conductive) so the connection will now be encased in an insulating material. It will be appreciated that other materials may be used to insulate the connection. With sufficient insulative material around the connectors, the connectors will not be susceptible to a direct lightning strike through the surface of the blade.

The connection method described above with reference to the FIGS. 1-9 provides an improved method for connecting lightning protection components of first and second blade sections of a wind turbine blade assembly. The invention described herein enables a connection to be established more easily than previously known methods without the need for access holes, hatches or windows in the shells of a wind turbine blade. The connection can be made blind, i.e. without requiring access to the connection from the inside of the blade. A robust, torqued connection between lightning protection components can be achieved when assembling blade sections in the field. The use of an existing coupling and fastener in attaching a blade tip extension removes the need to drill and tap into stainless steel components on-site. Conductivity between lightning protection components is maintained via a clamped face-to-face connection, using bolts with an oversized shank and/or thread to provide a clamping force between the connectors.

Critical on-site alignment constraints of previous connection methods are mitigated through the use of large contact areas at the connection point between lightning protection components of a first and second blade section. Improved clearance angles between the connecting components provide easier alignment and reduce the risk of the connecting components clashing during assembly. The connection method of the present invention enables the connection of surface protection layers and general down conductor connection to be combined into one connection.

Many modifications may be made to the specific examples described above without departing from the scope of the invention as defined in the accompanying claims.

The invention claimed is:

1. A wind turbine blade assembly comprising:
   first and second blade sections connected together, each blade section having a shell defining an aerodynamic profile and each section comprising lightning protection components;
   a substantially enclosed interior region that is external to the second blade section and defined in part by the shell of the first blade section and in part by the shell of the second blade section;
   a first connector located in the interior region, the first connector being attached to the first blade section and electrically connected to the lightning protection components of the first blade section, the first connector defining a contact surface;
   a second connector located in the interior region, the second connector being attached to the second blade section and electrically connected to the lightning protection components of the second blade section, the second connector defining a contact surface opposed to and in physical contact with the contact surface of the first connector; and
   a first fastener extending through the shell of the first blade section into the interior region, the first fastener having a threaded shank that extends at least partially through the first and second connectors,
   wherein the first fastener clamps the contact surfaces of the first and second connectors together to form a torqued connection between the first and second connectors.

2. The wind turbine blade assembly of claim 1, wherein the first blade section is a tip extension and the second blade section is a wind turbine blade adapted to receive the tip extension, or wherein the first and second blade sections are respective modules of a modular wind turbine blade.

3. The wind turbine blade assembly of claim 1, wherein the first connector is attached to an inner surface of the shell of the first blade section and/or the second connector is attached to an end face of the second blade section or the second connector is attached to an inner surface of the shell of the second blade section.

4. The wind turbine blade assembly of claim 1, wherein one of the first or second connectors comprises a through bore having a diameter that is oversized in comparison to a diameter of the shank of the first fastener and wherein the shank extends through the through bore and into mating engagement with the other connector.

5. The wind turbine blade of claim 1, wherein a second fastener extends through the shell of the first blade section and at least partially through the first and second connectors, the first and second fasteners extending through opposite sides of the shell of the first blade section.

6. The wind turbine blade assembly of claim 1, wherein the first and second connectors are shaped as wedges.

7. The wind turbine blade assembly of claim 1, wherein the second connector is configured to bend or flex upon sliding contact with the first connector to cause the contact surface of the second connector to become flush with the contact surface of the first connector.

8. The wind turbine blade assembly of claim 1, wherein the first blade section includes a metallic layer at or near an outer surface of its shell, and wherein the first fastener electrically connects the metallic layer to the first and second connectors.

9. The wind turbine blade assembly of claim 8, wherein the second blade section includes a metallic layer at or near an outer surface of its shell and a further fastener extends through the shell of the second blade section to electrically connect the metallic layer of the second blade section with the second connector such that the first and second connectors electrically connect the respective metallic layers of the first and second blade sections.

10. The wind turbine blade assembly of claim 1, wherein the contact surfaces of the first and second connectors are mutually parallel planar surfaces.

11. The wind turbine blade assembly of claim 1, wherein the first fastener is a metal bolt.

12. A method of forming a blind connection between lightning protection components of a first blade section and lightning protection components of a second blade section when connecting the first and second blade sections together, the method comprising:

providing a first blade section having a shell defining an aerodynamic profile, the first blade section comprising a first connector electrically connected to the lightning protection components of the first blade section, the first connector defining a contact surface;

providing a second blade section having a shell defining an aerodynamic profile, the second blade section comprising a second connector electrically connected to the lightning protection components of the second blade section, the second connector defining a contact surface;

arranging the first and second blade sections together such that the respective shells of the first and second blade sections define a substantially enclosed region that is external to the second blade section and defined in part by the shell of the first blade section and in part by the shell of the second blade section in which the first and second connectors are located with their respective contact surfaces mutually opposed and in physical contact;

inserting a fastener through the shell of the first blade section such that a threaded shank of the fastener extends into the interior region and extends at least partially through the first and second connectors; and turning the fastener from outside the shell of the first blade section to create a clamping force between the contact surfaces of the first and second connectors thereby establishing a torqued connection between the first and second connectors.

13. The method of claim 12, wherein the step of arranging the first and second blade sections together causes the first connector to slide into position relative to the second connector.

14. The method of claim 13, wherein sliding contact between the contact surfaces of the connectors causes the second connector to bend or flex such that the contact surface of the first connector becomes flush with the contact surface of the second connector.

15. The method of claim 12, wherein the connectors are wedge shaped and taper in thickness in opposite directions, such that sliding contact between the connectors causes intimate contact between the respective contact surfaces.

* * * * *